United States Patent [19]
Holyoak

[11] 4,437,259
[45] Mar. 20, 1984

[54] TURTLE TRAP AND PROCESS OF TRAPPING TURTLES

[76] Inventor: Hugh K. Holyoak, Rte. #1, Alapaha, Ga. 30130

[21] Appl. No.: 261,014

[22] Filed: May 6, 1981

[51] Int. Cl.³ .............................................. A01K 69/10
[52] U.S. Cl. ...................................................... 43/105
[58] Field of Search ................... 43/69, 105, 102, 100, 43/103, 104

[56] References Cited

U.S. PATENT DOCUMENTS

| | | | |
|---|---|---|---|
| 335,081 | 1/1886 | Long | 43/69 |
| 887,843 | 5/1908 | Pierce | 43/69 |
| 894,576 | 7/1908 | Berg | 43/69 |
| 1,353,882 | 9/1920 | Wojcik | 43/69 |
| 1,366,989 | 2/1921 | Wigington | 43/69 |
| 1,927,599 | 9/1933 | Smith | 43/103 |
| 2,168,065 | 8/1939 | Heidinger | 43/69 |
| 2,579,093 | 12/1951 | Roesner | 43/69 |
| 3,754,348 | 8/1973 | Ramsey | 43/103 |
| 3,919,803 | 12/1975 | Manguso | 43/55 |
| 4,251,943 | 2/1981 | Sawlsville | 43/55 |

OTHER PUBLICATIONS

Popular Mechanics, Jun. 1946, p. 191.

Primary Examiner—Nicholas P. Godici
Assistant Examiner—Kurt Rowan
Attorney, Agent, or Firm—Newton, Hopkins & Ormsby

[57] ABSTRACT

A rectangular bouyant frame float having an open interior supports by its upper edges the side walls of a flexible nonbouyant, open mesh, U-shaped, net cage which hangs pendant therefrom when the float is in the water. The float is provided with a flat walkway having inclined ramps connected at the ends of the walkway. The central portion of the walkway constitutes a trap which, when the turtle walks up the ramp and across a portion of the walkway, drops the turtle into the cage. A funnel shaped inwardly tapering entrance below the water provides an alternate second entrance for the turtle.

3 Claims, 15 Drawing Figures

TURTLE TRAP AND PROCESS OF TRAPPING TURTLES

BACKGROUND OF THE INVENTION

1. Field of the Invention

This invention relates to turtle traps and is more particularly concerned with an apparatus for and process of trapping turtles.

2. Description of Prior Art

In the past, traps of various types have been developed, primarily for trapping land animals, such as muskrats. U.S. Pat. No. 1,238,026 discloses such a trap. In the trap of this patent, the muskrat climbs onto the trap and then falls through the hinged top closure and is captured within the box. This patent lacks any ramp or floating feature. Other U.S. patents which were disclosed by a preliminary search and which are deemed to be less pertinent are as follows:

Orbe: 1,419,199
Krause: 1,538,707
Russell: 2,234,983
Morford: 4,048,745
Nelson: 4,421,531

The traps of the above identified patents are not suitable for trapping turtles because they are not adapted to the habits of the turtle.

SUMMARY OF THE INVENTION

I have discovered that turtles have a habit of climbing onto limbs, logs and other debris which are found partially submerged in the water so as to sun themselves while sleeping or resting on a portion of the logs or debris above the water level. They then tend to drop into the water and swim off. The present invention provides what appears to be an area on which the turtle may sun himself but, in fact, provides a trap board which releases the turtle into a cage, therebelow.

Briefly described, the present invention includes a rigid rectangular bouyant frame float formed of hollow, tubular, plastic, members having a smooth exterior to define an open interior. The frame float, floats in the water and supports the upper edge portions of the sides of a one-piece, porous, flexible, nonbouyant, open mesh, net cage, hanging pendant therebelow. Most embodiments of the invention have a walkway with ramps which permit the turtle to crawl onto the walkway. In one embodiment, a portion of the walkway is pivoted about a longitudinal axis to define a trap board which pivots sideways, being returned by a counterweight to its level position. In another embodiment, the weight of the trap board, itself, returns the trap board to its normal position after dropping the turtle by laterally pivoting. In still another embodiment, spring means permit pivoting of portions of the trap board about transverse axes. In another embodiment, the trap boards are hingedly carried, being pivotable about transverse axes adjacent to the end portions of the platforms of the walkway. In one embodiment, the walkway itself forms the trap board even though it is level at all times, because, the turtle, after sunning will drop into the water in the cage, rather than return to the ramp. An optional feature of this last embodiment is the transparent shield which prevents the turtle from walking from end to end on the walkway. This encourages the turtle to drop into the cage rather than turn around. In the last embodiment, the cage is optionally provided with a tapered entrance funnel below the water level.

Accordingly, it is an object of the present invention to provide a turtle trap which is inexpensive to manufacture, durable in structure and efficient in operation.

Another object of the present invention is to provide a turtle trap which can be shipped in an unassembled condition and readily and easily assembled when it is desired to use the trap.

Another object of the present invention is to provide a turtle trap which has few, if any, moving parts.

Another object of the present invention is to provide a turtle trap which is quite durable in and around both fresh and salt water.

Another object of the present invention is to provide a turtle trap and process of trapping turtles which requires no bait.

Another object of the present invention is to provide a turtle trap which will automatically reset itself so that it may effectively trap turtles successively, without injuring the turtle and without subjecting the turtle to any appreciable pain.

Another object of the present invention is to provide an inexpensive yet efficient process of trapping turtles.

Other objects, features and advantages of the present invention will become apparent from the following description when taken in conjunction with the accompanying drawings wherein like characters of reference designate corresponding parts throughout the several views.

DESCRIPTION OF THE PREFERRED EMBODIMENTS

Figure 1:
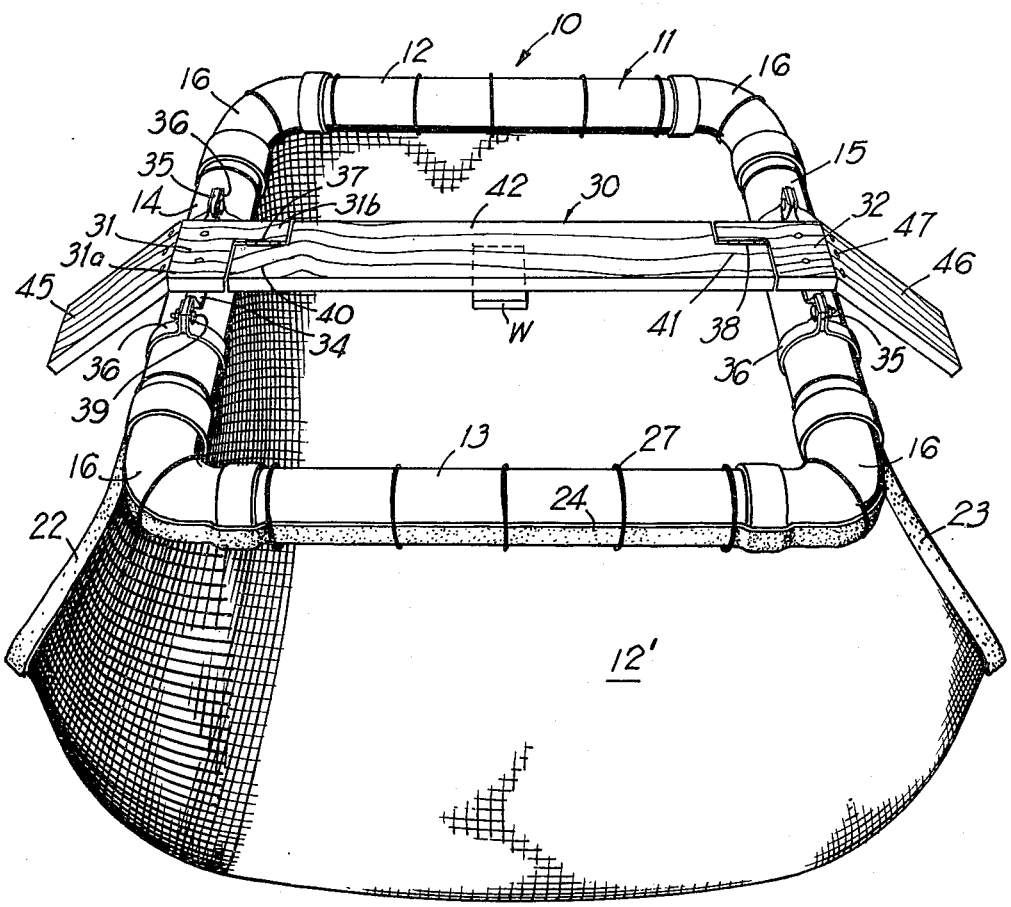
FIG. 1 is a perspective view of one embodiment of a turtle trap constructed in accordance with the present invention.
Figure 5:
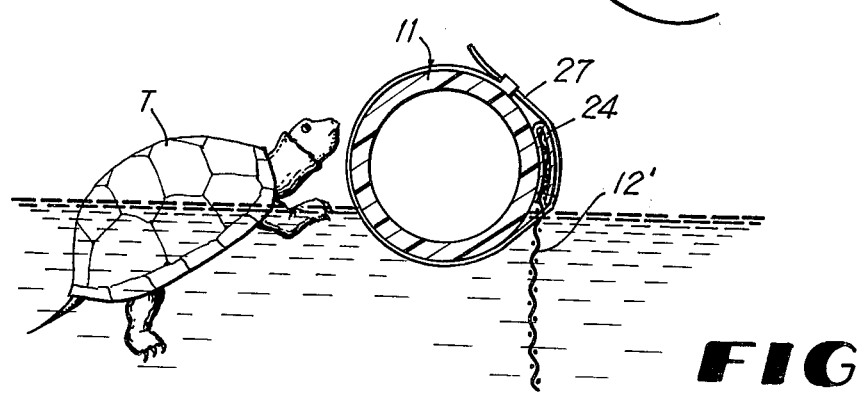
FIG. 5 is a fragmented elevational section of a portion of the turtle trap in its environment.

Referring now in detail to the embodiments chosen for the purpose of illustrating the present invention, numeral 10, in FIGS. 1 through 5, denotes generally the trap which includes the float, denoted generally by numeral 11, and the cage, denotes generally by numeral 12. The float 11 includes an open frame which, in the present instance, is rectangular. This open frame includes a pair of straight, spaced, longitudinally extending, hollow, tubular, cylindrical, side members 13 and a pair of straight, parallel, spaced, hollow, tubular, cylindrical, transversely extending end members 14 and 15. The corners of the rectangular float 11, are formed by elbow members 16 which respectively receive the adjacent ends of the tubular members 13, 14 and 15 so that a continuous closed hollow member is formed. The tubular members 13, 14 and 15 are preferably formed of hollow PVC pipe usually about 2 inches to about 6 inches in diameter and having a smooth slick outer surface, the pipe being of a diameter sufficient that, when it is closed off to form a continuous ring, will float. In like fashion, the hollow elbow members 16 are formed of PVC piping, curved through 90 degrees. The ends of the tubular members 13, 14 and 15 are glued in place in conventional fashion into the elbows 16, as illustrated in FIG. 1. The axes of the tubular cylindrical pipes which form the tubular members 13, 14 and 15 lie in a common plane and the float 11 is symetrical so that it is bouyed up and floats uniformly and partially submerged in the water. The float 11 is usually about 2 feet to about 8 feet long and will float awash but with sufficient freeboard to prevent the turtle from crawling over the slick upper surface of the float 11 after entrapment as illustrated in FIG. 5.

The nonbouyant, porous, open mesh, flexible, net, plastic, bag-like, cage 12, hangs pendant from the float 11 so that the float 11 holds the mouth of cage 12 in an open position as defined by the open interior 17 of the float member 11. In more detail, the cage 12 includes a unitary single sheet or web of an open mesh plastic net which forms the body 21 of the cage. This body 21 is initially rectangular in shape and its perimeter is covered by a U-shaped plastic sheet, which loops over the edge portions of the body 21 to form longitudinally opposed end strips 22 and 23 and transversely opposed upper edge strips 24 and 25. The length of the edges defined by strips 24 and 25 are equal to each other and also equal to about one half of the outside perimeter of the float 11. Stainless steel staples extend through the U-shaped sheets 22, 23, 24 and 25 for securing them in place.

Figure 2:
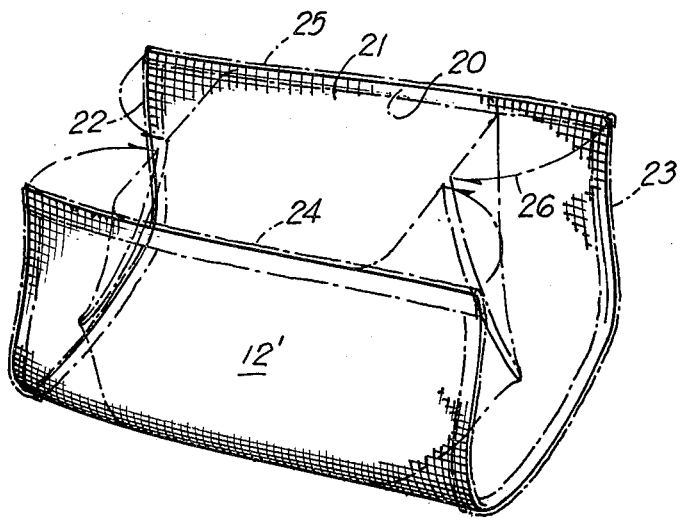
FIG. 2 is a perspective schematic view of the net of the cage portion of the trap depicted in FIG. 1, the net being shown partially assembled.
Figure 3:
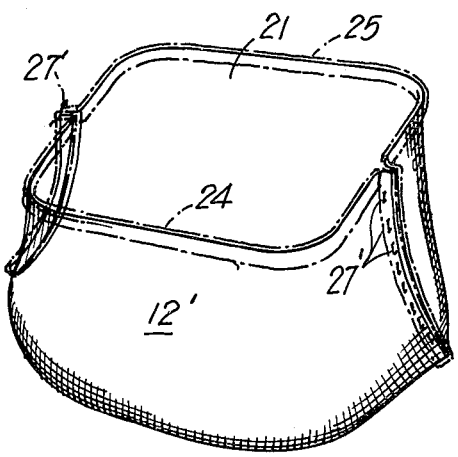
FIG. 3 is a view similar to FIG. 2, but showing the net more completely assembled.
Figure 4:
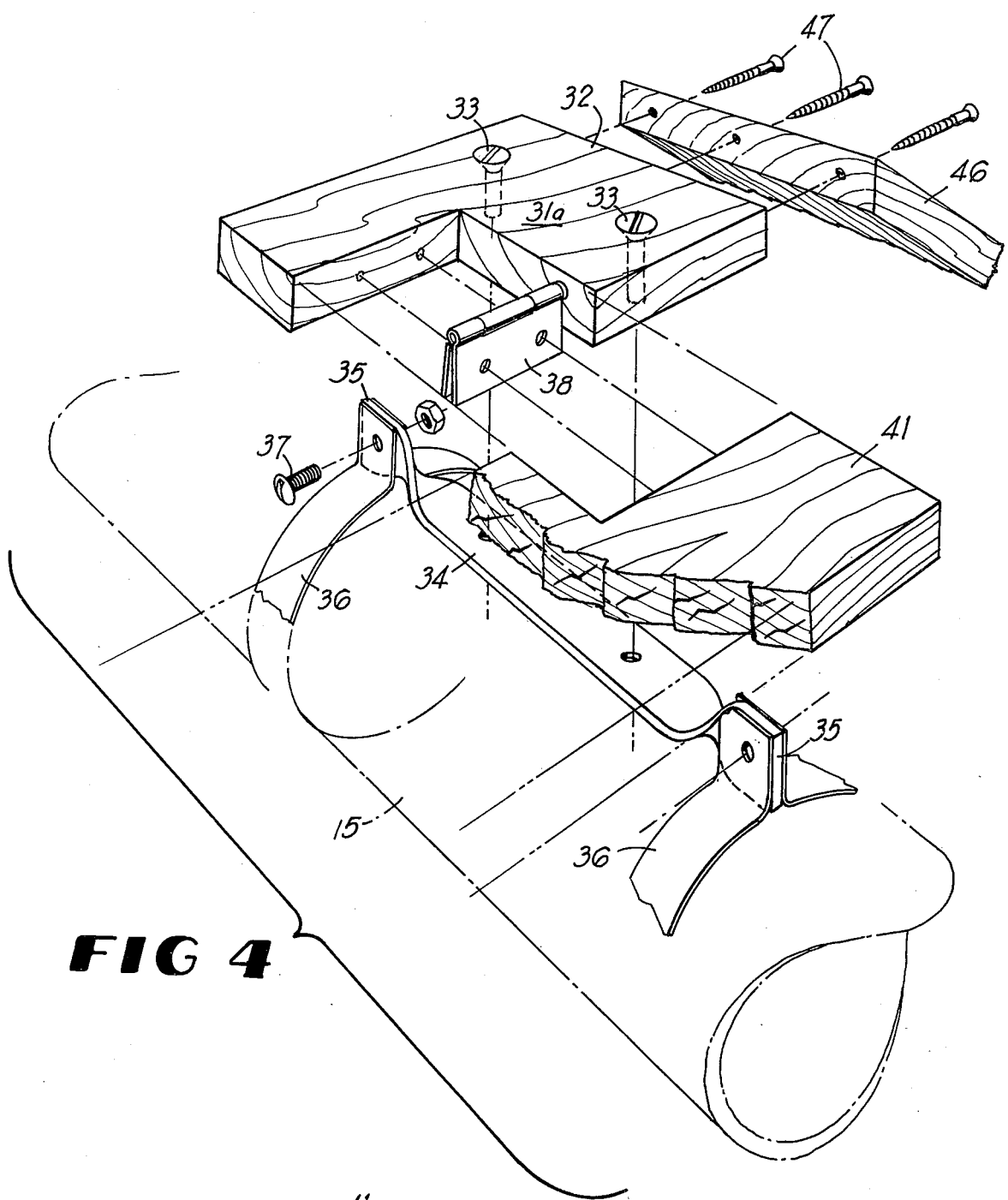
FIG. 4 is a perspective, fragmentary exploded view of a portion of the turtle trap embodied in FIGS. 1–3.

The cage 12 is assembled by initially forming the rectangular net 21 into a longitudinally extending U-shaped loop, as depicted in FIG. 2, and thereafter folding opposed portions of the strips 22 and 23 inwardly as illustrated by the arrows 26 in FIG. 2. These strips 22 and 23 are thus arranged vertically in abutting relationship as depicted in FIG. 3, the strips extending outwardly of the netting 21 to form opposed upstanding side seams. Stainless steel staples 27' are then passed through the abutting portion of the strip 22 and abutting portions of the strip 23 as illustrated in FIG. 3. Thus is provided the upwardly opening bag-like cage 12, the mouth of which is open and horizontal and defined by the strips 24 and 25. This upper end portion is then strapped by means of spaced slip straps, namely zip ties 27, shown in FIG. 1, to the outer periphery or perimeter of the float 11 so that the cage 12 is arranged with its mouth around the outer perimeter of the float 11. Thus, the wide portions of strips 24 and 25 are outboard of and against the outer periphery of the members 13, 14 and 15 of float 11. As best seen in FIG. 5, the arrangement of the mouth or upper opening of cage 12 on the outer side of float 11, presents only the smooth inner surfaces of the float 11 to the trapped turtle T and he cannot climb out.

The netting 21 cage 12' is preferably made of $\frac{1}{2}$ inch to $\frac{3}{4}$ inch VEXAR netting.

According to the present invention, a flat, horizontally disposed, uniform width, crawlway or walkway 30 for turtles T is disposed along the upper surface of the float 11, above the level of the water, the walkway 30 being centered longitudinally across float 11 so as to be between and an equal distance from and parallel to both longitudinal side members 13. The ends of the walkway 30 protrude over the upper edge portions of the end members 14 and 15 are provided with forward and rear downwardly and outwardly inclined access ramps 45 and 46. The central portion of the walkway 30 defines a trap board arrangement which drops the turtle through the opening 17 and into the cage 12, therebelow.

In the embodiment depicted in FIG. 1, the walkway, 30, includes a pair of flat, spaced, opposed, complimentary, platforms 31 and 32. Each platform 31 or 32 is an L-shaped member formed of wood, metal or plastic sheet or board. The platform 31 has a wide base 31a which is of a width equal to the width of the remainder of walkway 30. This base 31a is secured flat against a transverse support bar 34 by means of bolts or screws 33. The support bar 34 is a flat horizontal member spaced above and parallel to member 14, the ends of bar 34 being twisted at its ends to form vertically disposed end plates 35 sandwiched between upstanding portions of spaced, opposed, adjustable, securing straps 36, which extend around the end member 14. Bolts 39 pass through the ends of the securing straps 36 and through the plates 35 for retaining the bar 34 in place spaced above and parallel to the end member 14. The straps 36 circumscribe spaced portions of the end member 14, as illustrated in FIG. 2. Integral with and extending inwardly from the base 31a is a hinge supporting plate 31b which is to one side and about half the width of the walkway 30. The upper edge of plate 31b supports a hinge 37 having a pivot extending longitudinally. The platform 32 is secured, spaced above the end member 15 in the same manner as described for the securing of platform 31, on member 14.

The platform 32 is provided with a hinge member 38 which has its pivot axis aligned longitudinally with the pivot axis of hinge 37. It will be understood that one leaf of the hinges 37 is secured to the vertical portion of the hinge supporting plate, such as plate 31b, while the other leaf of the hinges 37 and 38 are secured to the sides of the outwardly extending wings 40 and 41 of a trip board 42.

In more detail, the trip board 42 is a normally level, horizontal, rectangular board which is the same width as the base platforms 31 and 32, but is notched at two of its corners to provide the indented shoulders or sides of wings 40 and 41 for receiving the leaves of the hinges 37 and 38 along the vertical longitudinal centerline of the board 42. Thus, the board is free to pivot about the longitudinal axis, defined by the aligned pivot pins of the hinges 37 and 38, this axis extending longitudinally at about the upper surface of the coplaner platforms 31 and 32 and board 42 and parallel to the longitudinal centerline of the board 42.

The wings 40 and 41 are of dimensions sufficient to be received in the notch formed by the L-shaped platforms 31 and 32, respectively. Thus, the upper surfaces of the platforms 31 and 32 and the upper surface of the trip board 42 normally lie in a common horizontal plane above the upper surface of the float 11. The bottom central portion of trip board 42 is provided with a counterweight W which returns the trip board 42 to its horizontal position when the trip board 42 has been pivoted therefrom. The leaves of the hinges 37 and 38 abut each other when the trip board 42 is in its horizontal position and, therefore, prevent further pivoting of the trip board 42 in the direction in which it is pulled by the counterweight W. Therefore, the trip board 42 remains horizontal until it is unbalanced by the weight of a turtle.

The forward end portion of platform 31 is provided with the front downwardly and forwardly inclined access ramp 45 which protrudes forwardly for a sufficient distance that its forward end portion is normally submerged sufficiently to permit a turtle T to climb from the water onto the ramp 45 and then walk up to the ramp 45 and onto the walkway 30. In like fashion, the rear platform 32 is provided with a rearwardly and downwardly extending rear access ramp 46 for the same purposes as described for ramp 45. Nails 47 retain the ends of ramps 45 and 46 respectively against the outer ends of platforms 31 and 32.

Figure 6:
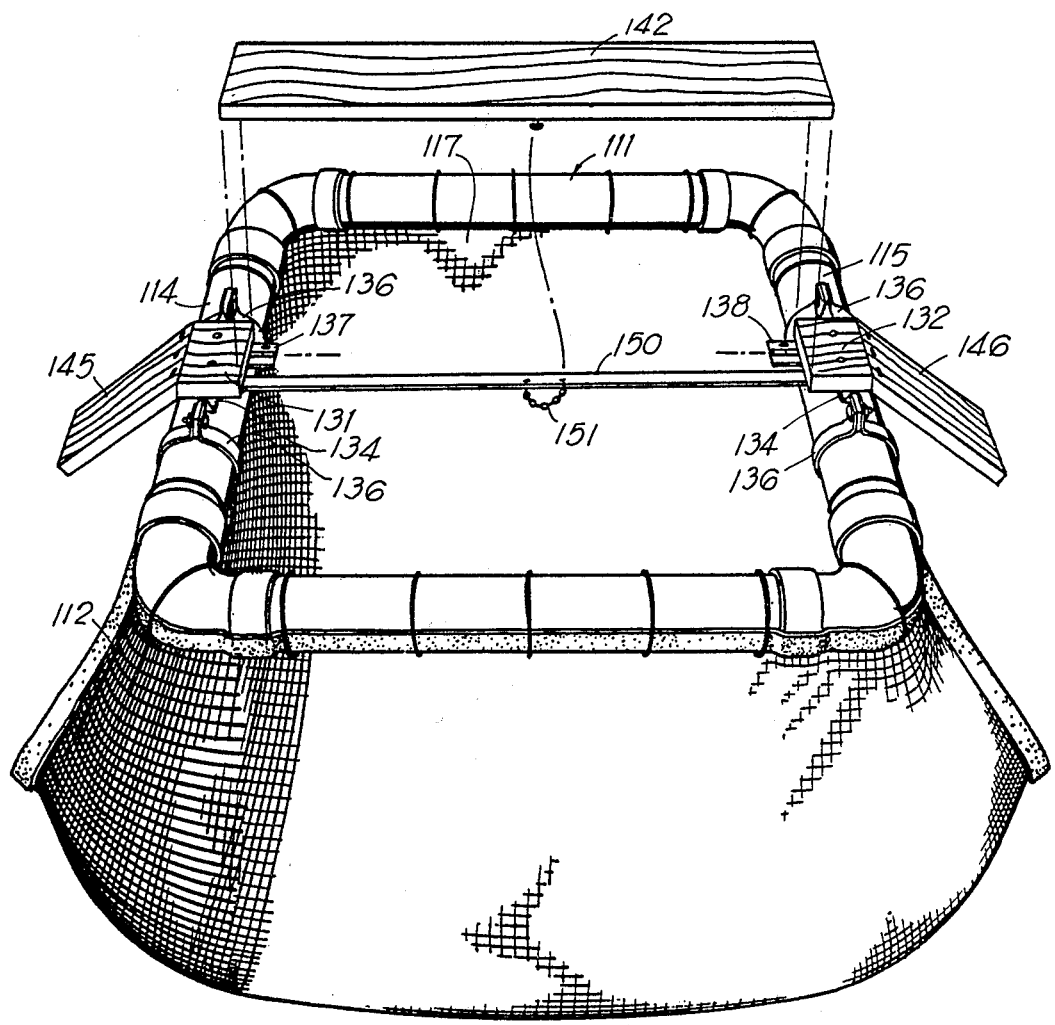
FIG. 6 is a perspective view of a second embodiment of the invention.

In the embodiment shown in FIG. 6, the float 111 and the trap or cage 112 are identical to the float 11 and cage 12' of the preceding embodiment. The float 111 therefore includes spaced, opposed, transverse parallel end members 114 and 115 which receive straps 136 supporting crossbars 134 which, in turn, support platforms 131 and 132 in opposed relationship in a common plane above the float 111. Each platform 131 and 132 is a rectangular member, the platform 131 being provided with a downwardly and forwardly extending ramp 145 and the rear platform 132 being provided with a downwardly and rearwardly extending ramp 146. In the present embodiment, the lower surfaces of the platforms 131 and 132 are respectively provided with opposed hinges 137 and 138, the hinge or pivot pins of which are aligned along a common longitudinal axis beneath platforms 131 and 132. The hinges 137 and 138 protrude inwardly of the inner edges of the platforms 131 and 132. The leaves of hinges 137 and 138 are usually horizontal so that one leaf of each hinge 137 or 138 is secured by its outer portion to the bottom surface of its associated platform 131 or 132, as the case may be, and the inner diagonal portion of the other leaf of each hinge 137 or 138 is secured to the bottom surface of a flat rectangular trap board 142.

The hinge pins of the hinges 137 and 138 are disposed slightly off center and thus laterally of the longitudinal centerline of the trap board 142. This tends to cause the board 142 to remain level but to pivot with the weight of a turtle. The pivoting beyond the level position is arrested by the hinges 137 and 138 preventing such movement. Furthermore, an aluminum or metal bar 150 is mounted in a longitudinal position, extending between the bottom surfaces of the platform, on a side laterally opposite to the sides which contain the hinge. The trip board 142 also rests upon this metal bar 150 when it is in its horizontal or level position with its upper surface coplanar with the upper surfaces of platforms 131 and 132 secured to the central portion of bar 150 and to one side of trip board 132 prevents the pivoting of the trip board 142, with the weight of the turtle, beyond about a 75 degree incline so that the center of gravity of the board 142 never passes beyond its top dead center position with respect to the hinge pins of the hinges 137 and 138. Thus, once the weight of the turtle is removed from the board by the turtle sliding off of the board 142 through opening 117 of the float 111, and into the trap or cage 112 the board 142 is returned by gravity to its horizontal position.

Figure 7:
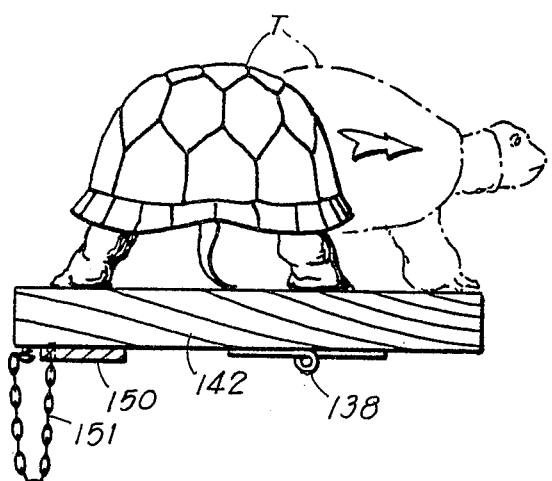
FIG. 7 is a fragmented sectional view of a portion of the trap shown in FIG. 6 in an initial stage of operation.
Figure 8:
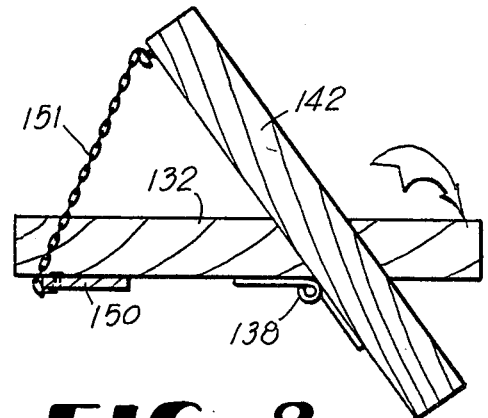
FIG. 8 is a fragmented sectional view of a portion of the trap as shown in FIG. 7 in tilt and dump stage of operation.

A turtle climbing up either ramp 145 or 146 and onto the platform 131 or 132 will be in a position to enter onto one end or the other of trip board 142. The trip board 142 is of a length less that the distance between members 114 and 115 and thus vertically over only opening 117. Board 142 only trips when the weight of the turtle overcomes the returning weight of the board 142 for causing the board to pivot from its horizontal to an inclined position to drop the turtle T as shown in FIGS. 7 and 8 sidewise off of the trip board 142 and through the opening 117 into the cage 112.

Figure 10:
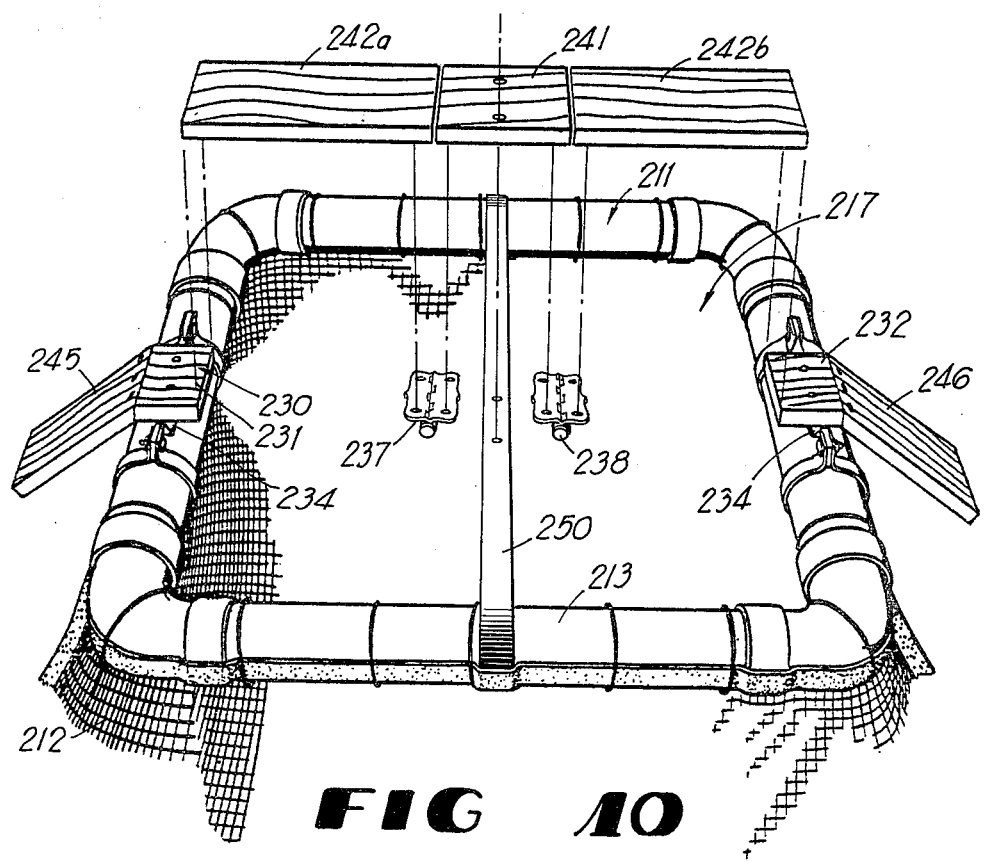
FIG. 10 is a fragmentary perspective view of a fourth alternate embodiment of the invention.

In the embodiment depicted in FIG. 10, the float 211 is provided with a cage 212 identical to the float 11 and cage 12 of the first embodiment. The platform 231 and 232 are provided with ramps 245 and 246 and are supported, to form end portions of crosswalk 230, by supports, such as crossbars 234, all as in the preceding embodiment depicted in FIG. 4. According to the embodiment of FIG. 10, a central crossbar 250 extends transversely across the middle portion of the float 211 between the longitudinal side members 213. This crossbar 213 curves partially around the outer peripheries of the longitudinal side members 213, as shown in FIG. 5. and may be bolted in place, if desired. The central portion of the crossbar 250 is provided with a level rectangular central platform 241 which protrudes forwardly and rearwardly of the crossbar 250. The forward transverse edge of the platform 241 is provided with a spring loaded hinge 237 and the rear edge of central platform 241 is provided with a rear spring loaded hinge 238. The hinge or pivot pins of hinges 237 and 238 extend transversely parallel to and spaced from each other and perpendicular to the longitudinal axis of the walkway 230 which is thus formed. The walkway 230 is completed by a pair of rectangular forwardly and rearwardly extending trip boards 242a and 242b. The forward trip board 242a is supported normally level, in cantilever fashion solely by the spring loaded hinge 237 and is of such a length that its forward transverse edge abuts the rear edge of the platform 231. Furthermore, the rear trip board 242b is also supported normally level in cantilever fashion by only the spring hinge 238 so that its rear transverse edge abuts the forward transverse edge of platform 232. In the normal position of the trip boards 242a and 242b, these trip boards have flat upper surfaces in a common horizontal plane with the upper surfaces of the platforms 231, 232 and 241. Furthermore, the platforms 231, 232 and 241 are of the same width as the widths of the brip boards 242a and 242b.

It is now seen that when a turtle crawls up ramp 245 or 246 it travels onto the platform 231 or 232 as the case may be. Thence, it walks onto the trip board 242a or 242b and overcomes the spring loading of the spring loaded hinge 237 or 238, as the case may be. This trip board 242a or 242b then pivots downwardly and inwardly to drop the turtle through the opening 217 into the cage 212.

Figure 9:
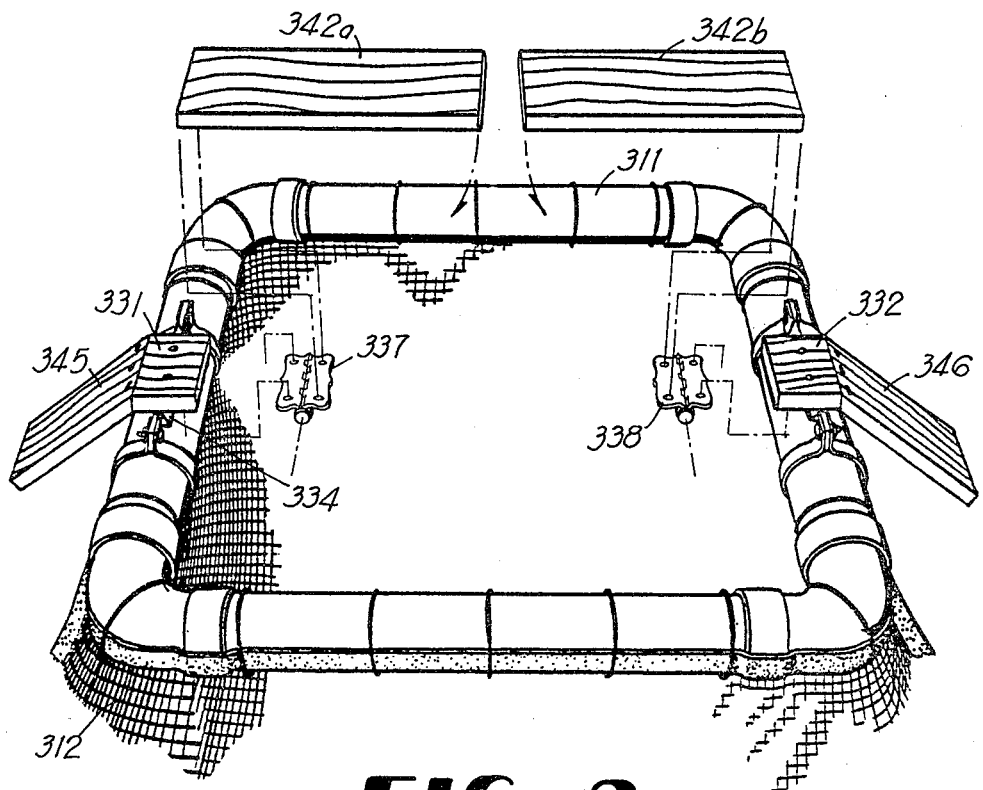
FIG. 9 is a fragmentary perspective view of a third alternate embodiment of the invention.

In the embodiment of FIG. 9, an arrangement very similar to the embodiment of FIG. 10 is shown, except that the trip boards 342a and 342b are hinged to the inner edge portions of forward and rear platforms 331 and 332 rather than to a central platform 241. In more detail, the float 311 and the cage 312 as well as the ramps 345 and 346 and the platforms 331 and 332 are identical to the structure of the preceding embodiment shown in FIGS. 4 and 5. The forward platform 231 is provided with a transversely extending spring loaded hinge 337 while the platform 332 is provided with a transversely extended spring loaded hinge 338. These spring loaded hinges 337 and 338 support in cantilever fashion a pair of normally level longitudinally aligned, opposed, complimentary trip boards 342a and 342b. The upper flat surfaces of the trip boards 342a and 342b lie in a common plane with the upper surfaces of the platforms 331 and 332, the trip boards 342a and 342b being of the same width as the width of the platforms 331 and 332. The springs 337 and 338 yieldably support the trip boards 342a and 342b in their horizontal positions as shown in FIG. 5; however, when a turtle walks onto either trip board 342a or 342b from the associated platform 331 or 332, the trip boards 342a or 342b gradually pivot downwardly to release the turtle into the water within the cage 312.

The platforms 331 and 332 are supported by crossbars 334 in the same manner that crossbar 34 supports its platform 31, in FIG. 6.

Figure 11:
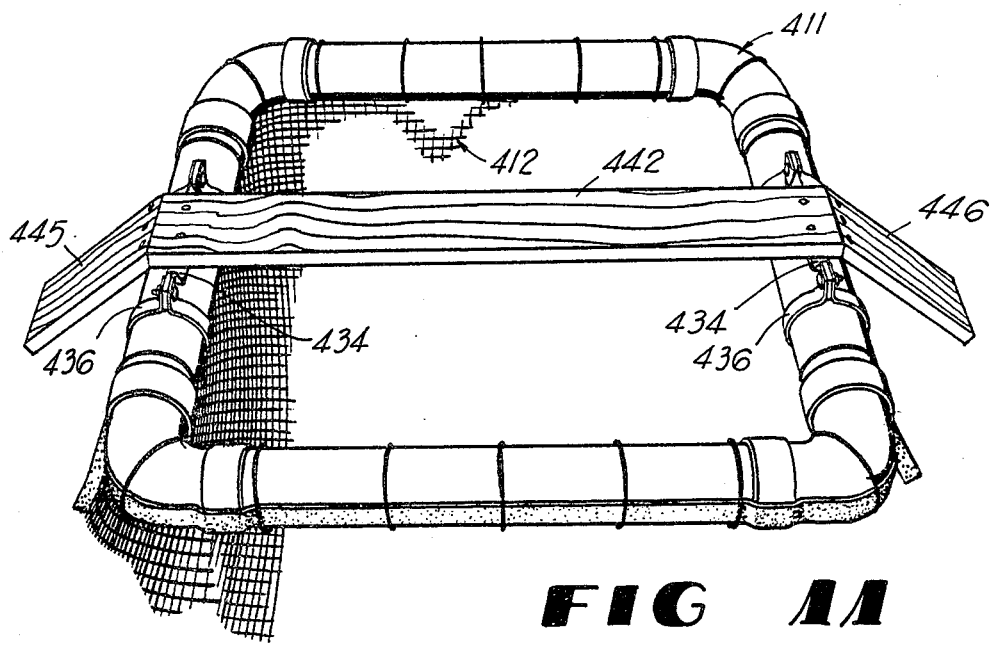
FIG. 11 is a view similar to FIGS. 6, 9 and 10, but showing a fifth embodiment of the present invention.

In the embodiment of FIG. 11, the float 411 and cage 412 are identical to float 11 and cage 12, however, the opposed paralled support bars 434, held by adjustable straps 436, support the trap board 442 above the upper surface of float 411, as a rigid walkway, no part of which pivots. The opposed inclined ramps 445 and 446 are inclined forwardly and rearwardly, respectively, from the ends of board 442 to terminate below the water line.

A turtle T walks up the ramp 445 or 446 and suns himself on the board 442. When he leaves, it is simpler to drop into the water than to move down the ramp 445 or 446. Thus, the turtle tends to drop in the cage 412.

Figure 12:
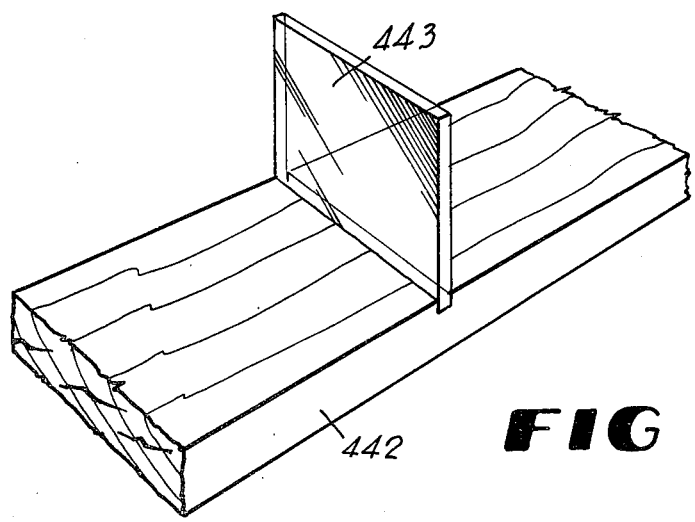
FIG. 12 is a view of a portion of the trap depicted in FIG. 11 and illustrating a shield which in an optional part of that trap.
Figure 13:
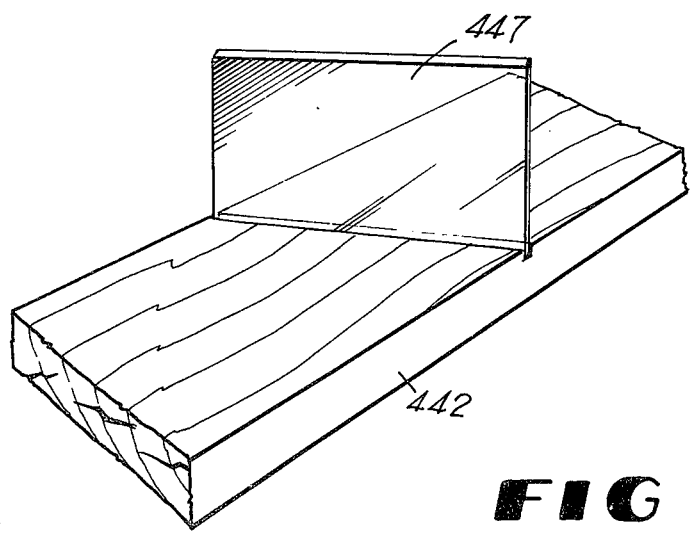
FIG. 13 is a view similar to FIG. 12 and showing a different manner of mounting the shield.

To facilitate the likelihood that the turtle T will drop into the cage 412, a transparent upstanding barrier plate 443 seen in FIG. 12 is optionally provided transversely across the central part of the board 442. This prevents the turtle T, for example, from going down ramp 446 when he has crawled up ramp 445. The barrier plate 443 therefore persuades the turtle to drop into the water rather than to turn around. The barrier 44 may be angled, as shown in FIG. 13 if desired. The trap board 442 as disclosed herein can be any rigid member with a smooth upper surface, wooden, plastic or metal, for example.

Figure 14:
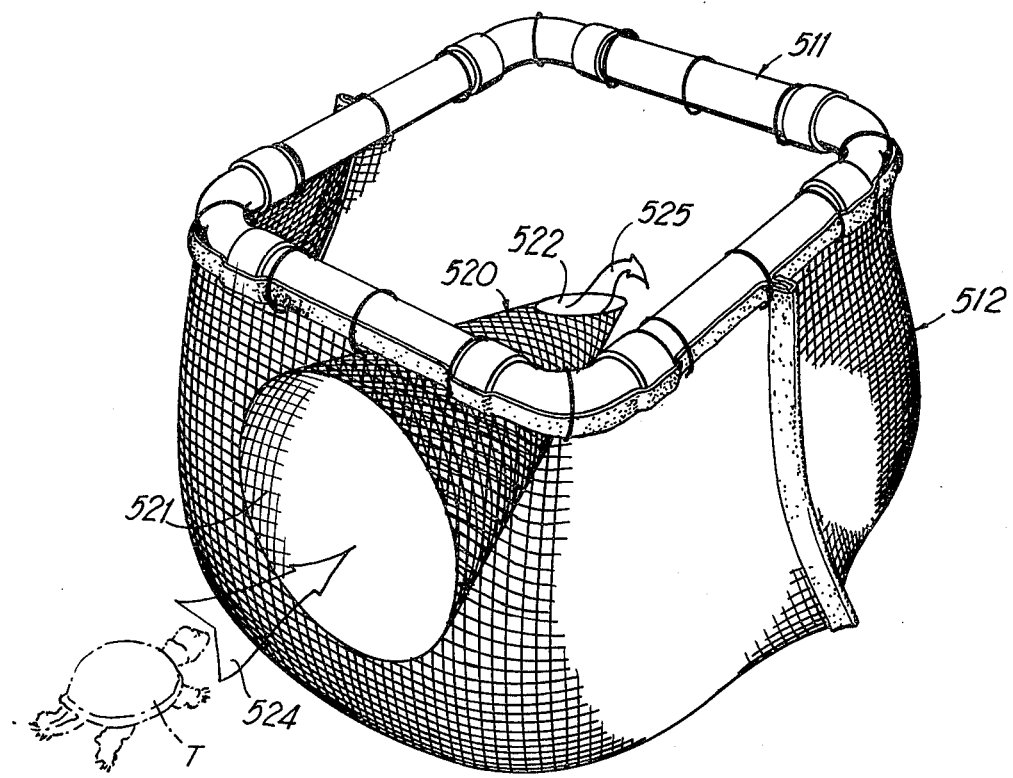
FIG. 14 is a perspective view of the float of the preceeding embodiments, provided with a second trap element, namely a tapered funnel, below water, entrance for the turtle.
Figure 15:
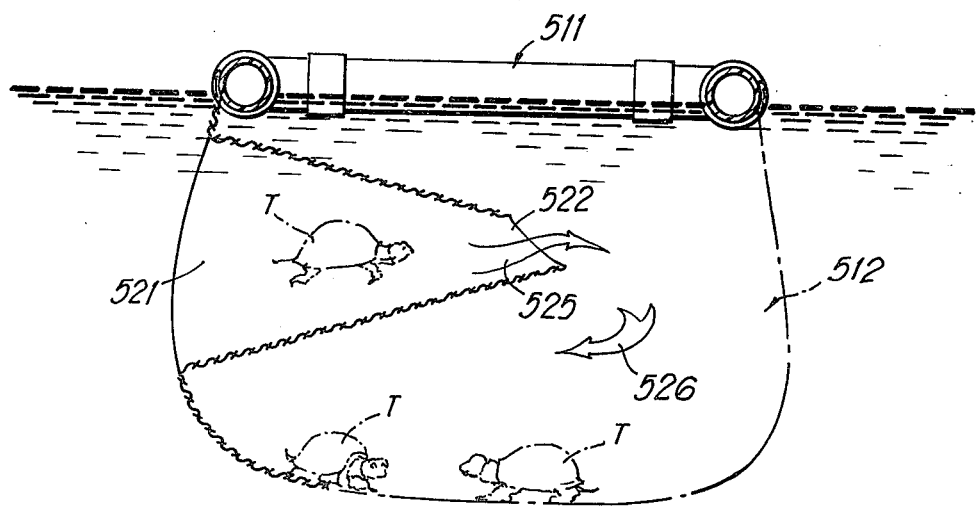
FIG. 15 is a schematic vertical sectional view of the top shown in FIG. 14.

In FIGS. 14 and 15, it is seen that the float 511 supports the cage 512 as in the preceeding embodiments. In this embodiment, however, there is a submerged or below the water line, alternate or second trap means in the form of a funnel shaped inwardly tapering entrance member 520. In more detail, entrance member 520 is a flexible, open mesh, plastic conical shaped, inwardly tapered, net member on about a horizontal axis, the outer end of the member defining a relatively wide inlet opening or mouth 521 and the inner end of which is cut at an angle to define an upwardly and inwardly exit opening 522.

It will be obvious to those skilled in the art that many variations may be made in the embodiments here chosen for the purpose of illustrating the present invention, without departing from the scope thereof, as defined by the appended claims.

The periphery defining mouth 520 is secured in a circular opening cut in the side of the cage 512, midway between its side seams 522 and 523. The entrance member 520 extends inwardly to terminate in the central portion of the cage, as seen in FIG. 15. Turtles T swim along the path of arrows 524, 525 and 526 into the cage 512. Once within the cage 512 the turtle T cannot find opening 522 to escape.

I claim:

1. A turtle trap comprising: a cage having a porous submergible portion with an open top, means for supporting said cage with said porous portion submerged in water, a trip board disposed over said open top of said cage, means for moveably supporting said trip board for pivoting to release a turtle from said trip board through said open top and into said cage, said trip board being disposed in spaced relationship above the water level of the water in said cage, and a ramp disposed adjacent one end of said trip board and protruding at an incline into the water exteriorly of said cage for providing, with said trip board, a walkway for a turtle entering the trap; hinge means connected to opposite end portions of said trip board and platforms disposed over said means for supporting said cage, said hinge means being connected respectively to said platforms for permitting pivoting of said trip board.

2. The turtle trap defined in claim 1 including a counterweight for causing said trip board to be disposed normally in a horizontal position, said counterweight also being operative to return said trip board to its horizontal position after the turtle has been released when said trip board is pivoted.

3. The turtle trap defined in claim 1 including a crossbar extending beneath a portion of said trip board and a chain extending between said crossbar and said trip board for arresting the pivotal movement of said trip board after it has tilted to an inclined position sufficient to release said turtle, said trip board having its center of gravity offset from the axis of pivoting of said pivot means sufficiently that said trip board is returned to a horizontal position after releasing said turtle.

* * * * *